(12) United States Patent
de Souza et al.

(10) Patent No.: US 6,493,667 B1
(45) Date of Patent: Dec. 10, 2002

(54) ENHANCED LIKELIHOOD COMPUTATION USING REGRESSION IN A SPEECH RECOGNITION SYSTEM

(75) Inventors: Peter V. de Souza, San Jose, CA (US); Yuqing Gao, Mount Kisco, NY (US); Michael Picheny, White Plains, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,669

(22) Filed: Aug. 5, 1999

(51) Int. Cl.[7] ............................................. G10L 15/14
(52) U.S. Cl. ..................................................... 704/240
(58) Field of Search ............................... 704/240, 256, 704/219, 236

(56) References Cited

U.S. PATENT DOCUMENTS

| | | | | |
|---|---|---|---|---|
| 4,489,435 A | * | 12/1984 | Moshier | 704/244 |
| 4,803,729 A | * | 2/1989 | Baker | 704/241 |
| 5,450,523 A | * | 9/1995 | Zhao | 704/243 |
| 6,330,536 B1 | * | 12/2001 | Parthasarathy et al. | 704/249 |

OTHER PUBLICATIONS

Kenny, Patrick, Matthew Lennig, and Paul Mermelstein, "A Linear Predictive HMM for Vector–Valued Observations with Applications to Speech Recognition," IEEE Trans. Acoust. Speech. and Sig. Proc., vol. 38, No. 2, Feb. 1990, pp. 220–225.*

Smith, F. J., J. Ming, P. O'Boyle, and A. D. Irvine, "A Hidden Markov Model with Optimized Inter–Frame Dependence," 1995 Int. Conf on Acoust. Speech and Sig. Proc. ICASSP–95, vol. 1, May 9–12, 1995, pp. 209–212.*

Bahl et al., "Robust Methods For Using Context–Dependent Features and Models in a Continuous Speech Recognizer," ICASSP, vol. 1, pp. 533–536, 1994.

P.F. Brown, "The Acoustic–Modeling Problem in Automatic Speech Recognition," Ph.D. thesis, IBM RC 12750, pp. 56–62, 111–113, 1987.

* cited by examiner

Primary Examiner—Vijay Chawan
Assistant Examiner—Donald L. Storm
(74) Attorney, Agent, or Firm—Paul J. Otterstedt; Ryan, Mason & Lewis, LLP

(57) ABSTRACT

In order to achieve low error rates in a speech recognition system, for example, in a system employing rank-based decoding, we discriminate the most confusable incorrect leaves from the correct leaf by lowering their ranks. That is, we increase the likelihood of the correct leaf of a frame, while decreasing the likelihoods of the confusable leaves. In order to do this, we use the auxiliary information from the prediction of the neighboring frames to augment the likelihood computation of the current frame. We then use the residual errors in the predictions of neighboring frames to discriminate between the correct (best) and incorrect leaves of a given frame. We present a new methodology that incorporates prediction error likelihoods into the overall likelihood computation to improve the rank position of the correct leaf.

15 Claims, 1 Drawing Sheet

FIG. 1
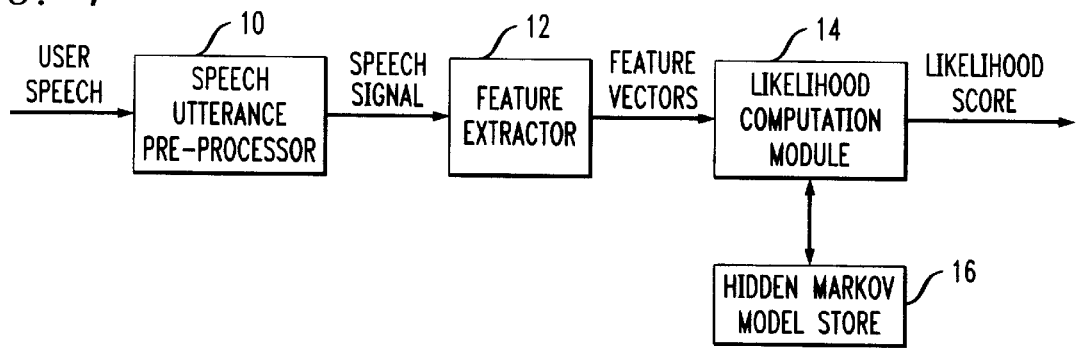
FIG. 2
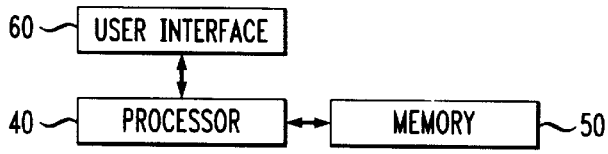
FIG. 3
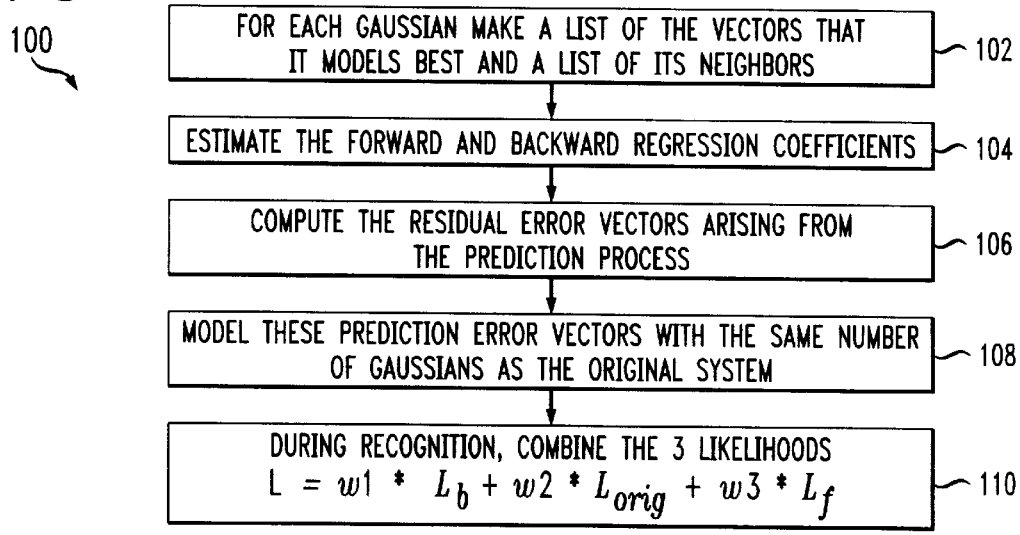
FIG. 4
| SYSTEM | BASELINE | NEW SCHEME |
|---|---|---|
| WSJ | 9.1% | 8.1% |
| LVCSR TASK | 12.8% | 11.8% |
| AFTER EM | 12.54% | 11.6% |

ENHANCED LIKELIHOOD COMPUTATION USING REGRESSION IN A SPEECH RECOGNITION SYSTEM

FIELD OF THE INVENTION

The present invention relates generally to speech recognition systems and, more particularly, to methods and apparatus for performing enhanced likelihood computation using regression in speech recognition systems.

BACKGROUND OF THE INVENTION

It is known that a continuous speech recognition system, such as the IBM continuous speech recognition system, uses a set of phonetic baseforms and context dependent models. These models are built by constructing decision tree networks that query the phonetic context to arrive at the appropriate models for the given context. A decision tree is constructed for every arc (sub-phonetic unit that corresponds to a state of the three state Hidden Markov Model or HMM). Each terminal node (leaf) of the tree represents a set of phonetic contexts, such that the feature vectors observed in these contexts were close together as defined by how well they fit a diagonal gaussian model. The feature vectors at each terminal node are modeled using a gaussian mixture density with each gaussian having a diagonal covariance matrix. The IBM system also uses a rank-based decoding scheme, as described in Bahl et. al, "Robust-methods for using context-dependent features and models in a continuous speech recognizer," ICASSP 1994, Vol. 1, pp. 533–536, the disclosure of which is incorporated herein by reference. The rank $r(l, t)$ of a leaf l at time t is the rank order of the likelihood given the mixture model of this leaf in the sorted list of likelihoods computed using all the models of all the leaves in the system and sorting them in descending order. In a rank-based system the output distributions on the state transitions of the model are expressed in terms of the rank of the leaf. Each transition with arc label a has a probability distribution on ranks which typically has a peak at rank one and rapidly falls off to low probabilities for higher ranks. The probability of rank $r(l, t)$ for arc a is then used as the probability of generating the feature vector at time t on the transition with arc a.

The more number of times a correct leaf appears in the top rank positions, the better the recognition accuracy. In order to improve the rank of the correct leaf, its likelihood score has to be boosted up relative to other leaves. This implies that the likelihood score for the correct leaf will be increased while those of the incorrect leaves will be decreased. A scheme to increase the likelihood of the correct leaf that captures the correlation between adjacent vectors using correlation models was introduced in, P. F. Brown, "The Acoustic-Modeling Problem in Automatic Speech Recognition," Ph. D. thesis, IBM RC 12750, 1987.

The approach in the P. F. Brown thesis was to do away with the assumption that given the output distribution at time t, the acoustic observation at time t is independent of that at time t−1, or depends only on the transition taken at time t ($P(y_t|s_t)$), where $y_t$ refers to the cepstral vector corresponding to the speech at time t, $s_t$ refers to the transition at time t, and $P(y_t|s_t)$ refers to the likelihood (i.e., probability) of generating $y_t$ on the transition at time t, as understood by those skilled in the art. The manner in which $y_{t-1}$ differs from the mean of the output distribution from which it is generated, influences the way that $y_t$ differs from the mean of the output distribution from which it is generated, where $y_{t-1}$ refers to the cepstral vector corresponding to the speech at time t−1. This is achieved by conditioning the probability of generating $y_t$ on the transition at time t, the transition at time t−1 (i.e., $s_{t-1}$) and $y_{t-1}$, that is:

$$P(y_t|s_t,s_{t-1},y_{t-1}) \quad (1)$$

Incorporating this into an HMM would in effect square the number of output distributions and also increase the number of parameters in each output distribution. When the training data is not sufficient, the benefit of introducing the correlation concept may not be seen. Alternatively the probability could be conditioned only on the transition taken at time t and the output at $y_{t-1}$, that is:

$$P(y_t|s_t,y_{t-1}) \quad (2)$$

The output distribution for equation (2) has the form:

$$P(y_t|s_t,y_{t-1}) = det\ W^{1/2}1/(2\pi)^{n/2}exp[-\tfrac{1}{2}](Z'WZ) \quad (3)$$

where W refers to covariance, and Z is given by:

$$(Y_t-(\mu_t+C(y_{t-1}-\mu_{t-1}))) \quad (4)$$

where $\mu_1$ and $\mu_{t-1}$ refers to the mean at times i and t−1, respectively, as is known in the art, and C is the regression matrix given by:

$$C=\Sigma(y_t y_{t-1})/|y_t|^2 \quad (5)$$

This form only increases the number of parameters in each output distribution and not the number of output distributions, making it computationally attractive. However, from a modeling perspective, it is less accurate than equation (1) because the distribution from which $y_{t-1}$ was generated and its deviation from its mean are unknown. There is an important trade-off between the complexity of an acoustic model and the quality of the parameters in that model. The greater the number of parameters in a model, the more variance there will be in the estimates of the probabilities of these acoustic events.

It would be highly desirable to provide techniques for use in speech recognition systems for enhancing the likelihood computation while minimizing or preventing an increase in the complexity of the HMMs.

SUMMARY OF THE INVENTION

The present invention provides for methods and apparatus for improving recognition performance in a speech recognition system by improving likelihood computation through the use of regression. That is, a methodology is provided that increases the likelihood of the correct leaf that captures the correlation between adjacent vectors using correlation models. According to the invention, regression techniques are used to capture such correlation. The regression predicts the neighboring frames of the current frame of speech. The prediction error likelihoods are then incorporated or smoothed into the overall likelihood computation to improve the rank position of the correct leaf, without increasing the complexity of the HMMs.

In an illustrative embodiment of the invention, a method for use with a speech recognition system in processing a plurality of frames of a speech signal includes tagging feature vectors associated with each frame received in a training phase with best aligning gaussian distributions. Then, forward and backward regression coefficients are estimated for the gaussian distributions for each frame. The method further includes computing residual error vectors from the regression coefficients for each frame and then modeling the prediction errors to form a set of gaussian models for the speech associated with the each frame. The set of gaussian models are then used to calculate three sets of likelihood values for each frame of a speech signal received during a recognition phase.

Advantageously, in order to achieve low error rates in a speech recognition system, for example, in a system employing rank-based decoding, we discriminate the most confusable incorrect leaves from the correct leaf by lowering their ranks. That is, we increase the likelihood of the correct leaf of a frame, while decreasing the likelihoods of the confusable leaves. In order to do this, we use the auxiliary information from the prediction of the neighboring frames to augment the likelihood computation of the current frame. We then use the residual errors in the predictions of neighboring frames to discriminate between the correct (best) and incorrect leaves of a given frame. We present a new methodology that incorporates prediction error likelihoods into the overall likelihood computation to improve the rank position of the correct leaf.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a block diagram of an illustrative speech recognition system for employing an enhanced likelihood computation methodology according to the invention;

FIG. 2 is a block diagram of an illustrative hardware implementation of a speech recognition system for employing an enhanced likelihood computation methodology according to the invention;

FIG. 3 is a flow diagram of an illustrative enhanced likelihood computation methodology according to the invention; and FIG. 4 is a tabular representation of experimental results associated with an illustrative enhanced likelihood computation methodology according to the invention.

DETAILED DESCRIPTION OF PREFERRED EMBODIMENTS

The present invention will be explained below in the context of an illustrative speech recognition system. However, it is to be understood that the present invention is not limited to this or any particular speech recognition system. Rather, the invention is more generally applicable to any speech recognition system in which it is desirable to realize a reduced error rate through the use of regression in likelihood computation: By way of example only, generalized speech recognition systems such as the commercially available large vocabulary IBM ViaVoice or ViaVoice Gold systems (trademarks of IBM Corporation of Armonk, N. Y.) may be adapted to incorporate enhanced likelihood computation in accordance with the invention.

Referring initially to FIG. 1, a block diagram of an illustrative speech recognition system for use with the invention is shown. Before explaining an illustrative enhanced likelihood computation embodiment according to the invention, a brief explanation of the functionality of the components of the illustrative speech recognition system will now be given., A speech utterance pre-processor 10 receives the speech uttered by a user and generates representative speech waveforms, i.e., a speech signal. The speech utterance pre-processor 10 may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor 10 is the sampled speech waveforms or speech signal which is recorded and provided to a feature extractor 12.

The feature extractor 12 receives the speech signal and, as is known in the art, extracts spectral features from the signal at regular intervals, for example, about every 10 milliseconds. The spectral features are in the form of feature vectors (signals) which are then passed on to a likelihood computation module 14.

During training of the speech recognition system, the likelihood computation routine performed by the module 14 trains a set of acoustic models (HMMs), from feature vectors representing the training data, that will be used during real-time recognition or decoding of input speech signals. Such inventive training is accomplished using regression techniques, as will be illustratively described below. Further, during recognition, the likelihood computation module computes a likelihood score for each input frame using the models to determine the best word segment, word, or phrase to be output as the decoded output for each frame of speech. Due to the use of the improved models, as trained according to the invention, recognition accuracy is substantially improved.

Referring now to FIG. 2, a block diagram of an illustrative hardware implementation of a speech recognition system employing an enhanced likelihood computation methodology according to the invention, as will be explained below, is shown. In this particular implementation, a processor 40 for controlling and performing likelihood computation is coupled to a memory 50 and a user interface 60. It is to be appreciated that the term "processor" as used herein is intended to include any processing device, such as, for example, one that includes a CPU (central processing unit). For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), etc. In addition, the term "user interface" as used herein is intended to include, for example, one or more input devices, e.g., keyboard, for inputting data to the processing unit, and/or one or .more output devices, e.g., CRT display and/or printer, for providing results associated with the processing unit. The user interface 60 may also include a portion of the speech utterance pre-processor 10 (FIG. 1) such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 1 may be implemented in various forms of hardware, software, or combinations thereof, e.g., one or more digital signal processors with associated memory, application specific integrated circuit(s), functional circuitry,. one or more appropriately programmed general purpose digital computers with associated memory, etc. Given the teachings of the invention provided herein, one of ordinary skill in the related art will be able to contemplate other implementations of the elements of the invention.

Given the above-described illustrative speech recognition system, an illustrative method of computing regression coefficients and performing likelihood computation according to the invention in such a system will now be explained.

The regression techniques provided according the invention are based on the idea that if a leaf is the correct leaf for a particular frame, the leaf will be correlated with its immediate neighbors. Therefore, we should be able to use the leaf that describes the current frame of speech to also predict its neighboring frames. In other words, $S_t$ and $s_{t-1}$ are assumed to be the same. If it is the correct leaf, then the prediction error vectors will be small, otherwise it will be large. The error vectors can then be modeled with a diagonal gaussian mixture and the error likelihoods can be weighted and used to augment the overall likelihood computation of the leaf. As has been proven by our experiments, this results in improved ranks. We then smooth the prediction error likelihoods into the overall likelihood computation to improve the rank position of the correct leaf, without increasing the complexity of the HMMs. The resulting output distribution has a form similar to that of equation (2). However, Z is now given by:

$$(Y_t - (\mu_t + wC(y_{t-1} - \mu_{T-1}) - w(y_{t-1} - \mu_{t-1}))) \quad (6)$$

where w is the weighting factor used to smooth the error likelihoods with the usual gaussian mixture likelihoods. Computationally, this technique has the same number of parameters as equation (2). However, from a modeling point of view, the inventive approach is more accurate because of the presence of the additional term, which is the deviation of $y_{t-1}$ from its mean. In going from equation (1) to equation (2), the dependence on $S_{t-1}$ was dropped. Advantageously, we are retaining the dependence, but constraining it to be the same as $S_t$.

At the time of training, the feature vectors are tagged with the gaussian that best describes the state that they align to. The tagging of the vectors to the gaussian that models it the best, ensures that we are using the best possible data for prediction. The prediction is done at the gaussian level, hence, the training data vectors that are tagged with the same gaussian are used to estimate the regression coefficients, described below. This will subsequently be used in the prediction of the neighboring frames. Forward and backward regression coefficients are estimated for each gaussian. The residual error vectors are then computed. In addition to the conventional set of gaussian mixture models, we now use these error vectors to build two sets of gaussian mixture models, one each for the forward and backward prediction. In our implementation, instead of directly modeling equation (6), we have broken it into two distributions, the usual gaussian mixture distribution on the feature vectors and the gaussian distribution on the prediction error vectors and combined them using the smoothing factor w. We have also extended equation (6) to incorporate the errors in the prediction of both the previous and succeeding frames. During recognition, we use these three sets of gaussian models to calculate three sets of likelihoods for each frame of speech and use their weighted combination to get the final likelihood score. Because of the incorporation of the forward and backward prediction likelihoods into the final likelihood, the likelihood for the correct gaussian has been increased while the likelihoods for the incorrect gaussians have been decreased. This translates to increasing the rank of the correct leaf while decreasing the rank of the incorrect leaf, thereby introducing discrimination.

Computation of Regression Coefficients

Referring now to FIG. 3, a method of performing likelihood computation using regression is shown. Details of the method 100 are as follows. Since the regression is done at the gaussian level, there are as many regression coefficients as there are gaussians. First, for each gaussian, a list of the feature vectors that it best models and a list of its neighbors are made (step 102).

Then, in step 104, regression coefficients are estimated for each gaussian as follows:

$$C_{b,i} = \Sigma(y_t y_{t-1})/|y_t|^2$$
$$C_{f,i} = \Sigma(y_t y_{t+1})/|y_t|^2$$

where the sum runs over all $y_t$ which gaussian i models best, $y_t$, $y_{t-1}$ and $y_{t+1}$ are the cepstral vectors corresponding to the speech at time t, t−1 and t+1 respectively, and i is chosen from the mixture gaussian system containing M gaussians built from all of the training data. Note that these coefficients are the same ones given in equation (5). The residual error vectors are then computed in step 106 as:

$$e_{b,t} = C_{b,i} y_t - y_{t-1}$$
$$e_{f,t} = C_{f,i} y_t - y_{t+1}$$

where $C_{b,i}$ is the backward regression coefficient for the gaussian i that best models $y_t$, and $C_{f,i}$ is the forward regression coefficient for the gaussian i that best models $y_t$.

Each of the residual error vectors, $e_{b,t}$ and $e_{f,t}$ also has the same gaussian tag i, as each $y_t$. Each regression coefficient is an m x n matrix, where m is the dimensionality of the feature vector being predicted, and n is the dimensionality of the feature vector used to predict it plus a constant term, to produce a regression of the form ŷ=Ay+B. It is to be understood that m may or may not be equal to n. We now model these error vectors in step 108. All the $e_{b,t}$ vectors which have the same tag are used to build a single diagonal gaussian with mean and $\mu_{b,i}$ variance. This way we ensure that the number of gaussians used to model the $e_{b,t}$ vectors are the same as in the original system (i.e., the speech recognition system before employing enhanced likelihood computation methods of the invention). It is important to note here that since, the regression is done at the gaussian level, the regression coefficients are also tied to the gaussians. During recognition, the gaussian i is used to determine which regression coefficient has to be used for predicting the neighboring frames. By using the same number of gaussians to model the prediction error vectors, the likelihood computation can be simplified to a one-to-one weighted linear combination of the three sets of likelihoods.

Likelihood Computation

During recognition, in step 110 of FIG. 3, we use the three sets of gaussian models built above to calculate three sets of likelihoods for each frame of speech and use their weighted combination to get the final likelihood score.

$$L_{t,i,c} = \log N(x_t; \mu_i; U_i)$$

is the standard gaussian likelihood of a hidden markov model system, where N(.) denotes the gaussian density function with mean $\mu_i$ and variance $U_i$, and $x_t$ is the test data vector.

The backward-residual-error likelihoods are computed as:

$$L_{t,i,b} = \log N(e_{test,b,t,i}; \mu_{b,i}, U_{b,i})$$

The forward-residual-error likelihoods are computed as:

$$L_{t,i,f} = \log N(e_{test,f,t,i}; \mu_{f,i}, U_{f,i})$$

where $e_{test,b,t} = C_{b,i} \cdot Y_t - Y_{t-1}$, $e_{test,f,t} = C_{f,i} \cdot Y_t - Y_{t+1}$.

The final likelihood is given by:

$$L_{t,i} = w_1 L_{t,i,c} + w_2 L_{t,i,b} + w_3 L_{t,i,f}$$

where $w_1$, $w_2$ and $w_3$ are the weights assigned to the three likelihoods.

Because of the incorporation of the forward and backward prediction likelihoods into the final likelihood, the likelihood for the correct gaussian has been increased while the likelihoods for the incorrect gaussians have been decreased, thereby improving the rank of the correct leaf.

Variations in Regression Coefficients Computation

In our experiments, we predicted a 39 dimensional vector from a 13 dimensional vector. Hence, each regression coefficient is a 39×14 dimensional matrix. It is worthwhile to note here that the goal is not to obtain perfect prediction but to get good discriminant prediction between leaves. The regression was performed at the gaussian level. If a gaussian was built from sparse data, then data was borrowed from other gaussians modeling the same context dependent arc (leaf). If this was still insufficient, data was borrowed from other leaves of the same arc.

Experiments

The speech recognition system uses an alphabet of 52 phones. Each phone is modeled with a 3-state left-to-right HMM. The acoustic front-end uses a cepstral feature vector extracted every 10 milliseconds, along with delta and delta-delta information, as is well-known in the art, and sentence based cepstra mean normalization.

The training data for the two systems were different. For the WSJ task, we used the WSJ0 training data set. For the second large vocabulary continuous speech recognition task, we used an in-house data base consisting of 100 hours of training data collected from 2000 speakers. Both systems had approximately 3000 leaves.

The WSJ task had approximately 9 speakers and 6000 words in the test set and the LVSCR task had 10 speakers and 11000 words in the test set. The use of different systems indicates that the methodology of the invention provides consistent gains.

The smoothing weights: w1, the weighting factor for the backward prediction error likelihood, w2, the weighting factor for the usual gaussian mixture likelihood, and w3, the weighting factor for the forward prediction error likelihood, were chose to be 0.2, 0.6 and 0.2, respectively. The results are tabulated in the table of FIG. 4. It can be seen that there is approximately a 10% relative increase in the recognition accuracy when using the enhanced likelihood computation methodology of the invention over the usual gaussian mixture likelihood computation.

When the regression coefficients are re-estimated using gaussians obtained from .expectation maximization or EM training (see, e.g., the above-referenced P. F. Brown thesis), the resultant gaussians have better estimated parameters to model the data. The accuracy gets marginally better (see FIG. 4). This is because we are obtaining a better estimate of the regression coefficients and therefore predicting the neighboring frames better. This reinforces the likelihood computation in a manner that boosts the likelihood of the correct leaf for a given frame of speech.

The number of gaussians in the original system and the error gaussians are kept the same, so that the likelihoods from these gaussians can easily be incorporated into the overall likelihood. If the prediction was done at a higher level, i.e., at the leaf level or at the arc level, the number of gaussians would have been tied to the number of leaves or arcs. The rationale behind computations at gaussian level is that a finer resolution in modeling can be obtained in this manner. However, the invention may be implemented at a level other than at the gaussian level.

Accordingly, it has been demonstrated that computing better ranks results in better recognition accuracy. In using the inventive computation techniques, the average rank of the correct leaf increased from about 21 to about 15. Augmenting the original or conventional likelihood computation with prediction error likelihoods has resulted in increased accuracy. The invention can be extended such that the regression coefficients are computed for every leaf instead of every gaussian. The invention can also be used in a re-scoring framework when the first pass has been done using the conventional method of computing likelihoods. It can also be used as a confidence measure for estimating the prediction ability of the system to decide if data can be used for unsupervised adaptation. The prediction process can be expanded to include more neighboring frames instead of just one. Also, instead of using cepstral feature vectors, feature vectors obtained using a linear discriminant analysis or LDA transformation can be used for the forward and backward prediction.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use with a speech recognition system in processing a current frame of a speech signal, the method comprising the steps of:

computing a likelihood value for the current frame of the speech signal;

computing a likelihood value for at least one neighboring frame, the likelihood value of the neighboring frame including a likelihood value for at least one frame preceding and a likelihood value for at least one frame succeeding the current frame of the speech signal; and combining the likelihood values for the current and neighboring frames to form a final likelihood value for assignment in association with the current frame of the speech signal, wherein at least one of the likelihood values is assigned a corresponding weight before being combined.

2. The method of claim 1, wherein the likelihood value for the neighboring frame is a function of a prediction error computed for the neighboring frame.

3. The method of claim 2, wherein the prediction error is computed from a regression coefficient associated with the neighboring frame.

4. The method of claim 1, wherein computation of the neighboring frame likelihood value includes computing a likelihood value for at least one frame preceding the current frame and a likelihood value for at least one frame succeeding the current frame.

5. A method for use with a speech recognition system in modeling one or more frames of a speech signal, the method comprising the steps of:
tagging feature vectors associated with each frame received in a training phase with best aligning gaussian distributions;
estimating forward and backward regression coefficients for the gaussian distributions for each frame;
computing residual error vectors from the regression coefficients for each frame;
modeling prediction errors to form a set of gaussian models for speech associated with each frame;
computing one or more sets of likelihood values for each frame of a speech signal received during a recognition phase, the sets of likelihood values being based, at least in part, on the set of gaussian models; and
generating a final likelihood score for each frame of the speech signal, the final likelihood score being a weighted combination of each likelihood value in a set.

6. The method of claim 5, wherein each regression coefficient is an m×n matrix where m is a dimensionality of a feature vector being predicted and n is a dimensionality of a feature vector used to predict the feature vector being predicted plus a constant term.

7. A The method of claim 5, wherein the backward and forward regression coefficients are respectively represented as:

$$C_{b,i} = \Sigma(y_t \cdot y_{t-1})/|y_t|^2 \text{ and}$$

$$C_{f,i} = \Sigma(y_t \cdot y_{t+1})/|y_t|^2$$

where $y_t$, $y_{t-1}$ and $y_{t+1}$ are cepstral vectors corresponding to speech at time t, t−1 and t+1, respectively, and i is chosen from a mixture gaussian system containing M gaussians built from data associated with the training phase.

8. Apparatus for use with a speech recognition system in processing a current frame of a speech signal, the apparatus comprising:
at least one processor operable to compute a likelihood value for the current frame of the speech signal, to compute a likelihood value for at least one neighboring frame, the likelihood value of the neighboring frame including a likelihood value for at least one frame preceding and a likelihood value for at least one frame succeeding the current frame of the speech signal, and to combine the likelihood values for the current and neighboring frames to form a final likelihood value for assignment in association with the current frame of the speech signal, wherein at least one of the likelihood values is assigned a corresponding weight before being combined.

9. The apparatus of claim 8, wherein the likelihood value for the neighboring frame is a function of a prediction error computed for the neighboring frame.

10. The apparatus of claim 9, wherein the prediction error is computed from a regression coefficient associated with the neighboring frame.

11. The apparatus of claim 8, wherein computation of the neighboring frame likelihood value includes computing a likelihood value for at least one frame preceding the current frame and a likelihood value for at least one frame succeeding the current frame.

12. Apparatus for use with a speech recognition system in modeling one or more frames of a speech signal, the apparatus comprising:
at least one processor operable to tag feature vectors associated with each frame received in a training phase with best aligning gaussian distributions, to estimate forward and backward regression coefficients for the gaussian distributions for each frame, to compute residual error vectors from the regression coefficients for each frame, to model prediction errors to form a set of gaussian models for speech associated with each frame, to compute one or more sets of likelihood values for each frame of a speech signal received during a recognition phase, the sets of likelihood values being based, at least in part, on the set of gaussian models, and to generate a final likelihood score for each frame of the speech signal, the final likelihood score being a weighted combination of each likelihood value in a set.

13. The apparatus of claim 12, wherein each regression coefficient is an m×n matrix where m is a dimensionality of a feature vector being predicted and n is a dimensionality of a feature vector used to predict the feature vector being predicted plus a constant term.

14. The apparatus of claim 12, wherein the backward and forward regression coefficients are respectively represented as:

$$C_{b,i} = \Sigma(y_t \cdot y_{t-1})/|y_t|^2 \text{ and}$$

$$C_{f,i} = \Sigma(y_t \cdot y_{t+1})/|y_t|^2$$

where $y_t$, $y_{t-1}$ and $y_{t+1}$ are cepstral vectors corresponding to speech at time t, t−1 and t+1, respectively, and i is chosen from a mixture gaussian system containing M gaussians built from data associated with the training phase.

15. An article of manufacture for use with a speech recognition system in processing a current frame of a speech signal, comprising a machine readable medium containing one or more programs which when executed implement the steps of:
computing a likelihood value for the current frame of the speech signal;
computing a likelihood value for at least one neighboring frame, the likelihood value of the neighboring frame including a likelihood value for at least one frame preceding and a likelihood value for at least one frame succeeding the current frame of the speech signal; and
combining the likelihood values for the current and neighboring frames to form a final likelihood value for assignment in association with the current frame of the speech signal, wherein at least one of the likelihood values is assigned a corresponding weight before being combined.

* * * * *

UNITED STATES PATENT AND TRADEMARK OFFICE
CERTIFICATE OF CORRECTION

PATENT NO. : 6,493,667 B1
DATED : December 10, 2002
INVENTOR(S) : P.V. de Souza et al.

It is certified that error appears in the above-identified patent and that said Letters Patent is hereby corrected as shown below:

Column 7,
Line 63, please change ".expectation" to -- expectation --.
Line 56, after "0.2, respectively.", please begin a new paragraph.

Column 9,
Line 28, please delete "A" before "The method".

Column 10,
Line 37, please change "$y_{t+}$" to -- $y_{t+1}$ --.

Signed and Sealed this

Twentieth Day of May, 2003

JAMES E. ROGAN
*Director of the United States Patent and Trademark Office*